United States Patent [19]

Reitberger et al.

[11] 4,376,944

[45] Mar. 15, 1983

[54] INK JET PRINT HEAD WITH TILTING NOZZLE

[75] Inventors: Peter H. Reitberger, Munich; Wilhelm Ruprich, Augsburg, both of Fed. Rep. of Germany

[73] Assignee: NCR Corporation, Dayton, Ohio

[21] Appl. No.: 253,977

[22] Filed: Apr. 13, 1981

[51] Int. Cl.³ .......... G01D 15/18

[52] U.S. Cl. .......... 346/140 R

[58] Field of Search .......... 346/140 R, 75

[56] References Cited

U.S. PATENT DOCUMENTS

| | | | |
|---|---|---|---|
| 3,281,859 | 10/1966 | Stone | 346/75 |
| 3,757,346 | 9/1973 | Holland | 346/1.1 |
| 3,871,004 | 3/1975 | Rittberg | 346/75 |
| 3,925,791 | 12/1975 | Hunt | 346/140 |
| 4,240,081 | 12/1980 | Devitt | 346/75 |

OTHER PUBLICATIONS

Meier, J. H.; Mechanical X-Y Aiming of Ink Jet Printer Nozzles; IBM TDB, vol 15, No. 5, Oct. 1972, p. 1683.

Helinski, E. F.; Mounting of an Ink Jet Nozzle for Adjustment During Start-up and Shutdown; IBM TDB, vol. 18, No. 6, Nov. 1975, pp. 1813–1814.

*Primary Examiner*—Joseph W. Hartary

*Attorney, Agent, or Firm*—J. T. Cavender; Wilbert Hawk, Jr.; George J. Muckenthaler

[57] ABSTRACT

In ink jet printing, the ink droplets formed at the nozzle of the print head are selectively guided by tilting the nozzle against a resilient portion of the print head and relative to the normal ink droplet propelling direction. The tilting movement is accomplished by an electromagnet or by using conductive wires operably associated with permanent magnet plates in an arrangement such that the pivot of the tilting movement is located at the center of the orifice through the nozzle.

14 Claims, 8 Drawing Figures

INK JET PRINT HEAD WITH TILTING NOZZLE

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members, such as wires or the like, and which are typically moved by means of an electromechanical system which is believed to enable a more precise control of the impact members.

The advent of non-impact printing, as in the case of thermal printing, brought out the fact that the heating cycle must be controlled in a manner to obtain maximum repeated operations. Likewise, the control of ink jet printing, in at least one form thereof, must deal with rapid starting and stopping movement of the ink fluid from a supply of the fluid. In each case of non-impact printing, the precise control of the thermal elements and of the ink droplets is necessary to provide for both correct and high-speed printing.

In the matter of ink jet printing, it is extremely important that the control of the ink droplets be precise and accurate from the time of formation of the droplets to depositing of such droplets on paper or like record media, and to make certain that a clean printed character results from the ink droplets. While the method of printing with ink droplets may be performed either in a continuous manner or in a demand pulse manner, the latter method is disclosed in the present application as applying the features of the present invention. The drive means for the ink droplets is generally in the form of a crystal element to provide the high-speed operation for ejecting the ink through the nozzle, while allowing time between droplets for proper operation. The ink nozzle construction must be of a nature to permit fast and clean ejection of ink droplets from the print head. Additionally, any change in direction of the flight path of ink droplets emitted from the nozzle of an ink jet printer is desirably accomplished in simple yet accurate manner whereby selected droplets may be directed to precise locations on the record media.

Representative prior art in the field of ink droplet direction control for continuous flow droplet systems includes U.S. Pat. No. 3,416,153, issued to C. H. Hertz et al. on Dec. 10, 1968, which discloses an ink jet recorder wherein a liquid jet is projected along a jet axis from a nozzle to a surface. A signal source is connected between the nozzle and a control electrode which is disposed laterally of the jet axis for providing an electric field to charge the liquid jet and to diffuse the jet into small droplets. Additionally, U.S. Pat. No. 3,596,275, issued to R. G. Sweet on July 27, 1971, discloses a fluid droplet recorder wherein a stream of writing fluid in the form of a succession of uniformly spaced droplets are charged electrostatically in accordance with signal values and then deflected electrostatically in accordance with charges carried by the droplets. Droplets may be directed to intercepting means whereby droplets so directed are not deposited on the record medium.

U.S. Pat. No. 3,737,914, issued to C. H. Hertz on June 5, 1973, discloses a liquid jet recorder wherein electrically conductive fluid is pressure-ejected through a capillary nozzle to form a jet directed toward a recording sheet. The jet nozzle is supported in an element which can be moved in side-to-side direction to vary the direction of the jet axis. U.S. Pat. No. 4,138,688, issued to R. S. Heard et al. on Feb. 6, 1979, further discloses method and apparatus for automatically controlling the inclination of patterns in ink jet printers wherein the nozzle for emitting a stream of ink drops, the charge electrode for charging the ink drops, and the deflection electrodes for deflecting the ink drops are mounted on a carrier which moves relative to the ink drop record receiving media for forming images indicative of the signals on the deflected ink drops. A voltage difference is applied across the deflection electrodes to effect electric field distortion between the electrodes to compensate for the slant due to motion of the carrier.

Representative prior art in the field of ink droplet direction control for pulse-on-demand droplet systems includes U.S. Pat. No. 3,683,212, issued to S. I. Zoltan on Aug. 8, 1972, which discloses a pulsed droplet ejecting system having a transducer coupled to liquid in a conduit which terminates in a small orifice, and wherein pressure pulses created by the transducer have sufficient amplitude to overcome the surface tension at the orifice and eject liquid droplets therefrom. Additionally, U.S. Pat. No. 3,747,120, issued to N. G. E. Stemme on July 17, 1973, discloses an arrangement for applying droplets wherein an inner chamber is provided with a fluid pressure increasing device and is connected with an outer chamber having a discharge channel through which liquid is discharged in droplet form upon short duration pressure increases.

U.S. Pat. No. 3,832,579, issued to J. P. Arndt on Aug. 27, 1974, discloses a pulsed droplet ejecting system having a transducer coupled to liquid in a conduit which terminates in a small orifice, and wherein pulses applied to the liquid send pressure waves to the orifice for causing ejection of droplets and also send pressure waves in the opposite direction against energy absorbing means. Further, U.S. Pat. No. 3,946,398, issued to E. L. Kyser et al. discloses recording apparatus which includes a writing fluid source feeding a drop projection means in the form of a pressure or deflection plate in contact with the fluid and which ejects a series of droplets of fluid from a nozzle in a discontinuous stream.

Contrary to and distinguishing from the prior art wherein the common practice in continuous flow droplet systems has been to provide ink droplet producing or deflection means between the nozzle and the record media, it is proposed to provide by the present invention an ink jet print head having improved means whereby the direction and the flight path of the ink droplets are controlled by the selective positioning and attitude of the droplet producing nozzle itself.

SUMMARY OF THE INVENTION

The present invention relates to ink jet printers and more particularly, to means for directing the flow and path of ink in the form of ink droplets ejected from the nozzle or nozzles of an ink jet print head. The invention further relates to controlling the direction of such ink droplets through selective movement of the nozzle or nozzle plate at the front of the print head. The direction and the flight path of the ink droplets are thus controlled by moving or tilting the nozzle in relation to the normal direction of the ink channel through which passes the flow of ink.

In a preferred arrangement of the invention, the tilting movement of the nozzle or nozzle plate of a pulse-on-demand type print head is effected by use of an electromagnet which is positioned in the vicinity of the nozzle plate and operated to cause tilting of the plate for controlling the flight path of ink droplets from the nozzle or nozzles. The nozzle plate is attached to a metallic vane which in turn is attached to an elastic layer portion of the print head. The metallic vane has a portion adjacent the electromagnet and is moved or tilted by actuation of the electromagnet wherein the vane is controlled in attitude thereby and is easily moved with respect to the resiliency of the elastic layer portion. The ink which passes through the nozzle and is ejected therefrom in ink droplet form is directed in a path which is dependent upon the angle or incline of the orifice in the nozzle plate. The nozzle plate, in effect, is subject to movement about a pivot located at the center of the orifice therethrough.

A modification of the invention includes the use of electrical conductors adjacent the nozzle plate, which plate is in the form of a permanent magnet. A magnetic field is generated by an electric current flowing through the conductors which field induces an oscillating movement of the nozzle plate and of the nozzles. The pivot point of the nozzle plate movement is the center of gravity of the plate so as to minimize the mass and forces required to move the plate.

In view of the above discussion, the principal object of the present invention is to provide means for selectively controlling the flight path of ink droplets upon ejection from an ink jet print head.

Another object of the present invention is to provide means for changing the direction of the ink droplets from a path aligned with the direction of the ink channel located within the print head.

An additional object of the present invention is to provide means for providing predetermined direction of ink droplets to one or another path of travel from the nozzle of the print head.

A further object of the present invention is to provide a nozzle plate for ejection of ink droplets and means for moving the nozzle plate for changing the direction of the ink droplets.

Additional advantages and features of the present invention will become apparent and fully understood from a reading of the following description, taken together with the annexed drawing.

DESCRIPTION OF THE PREFERRED EMBODIMENT

Figure 1:
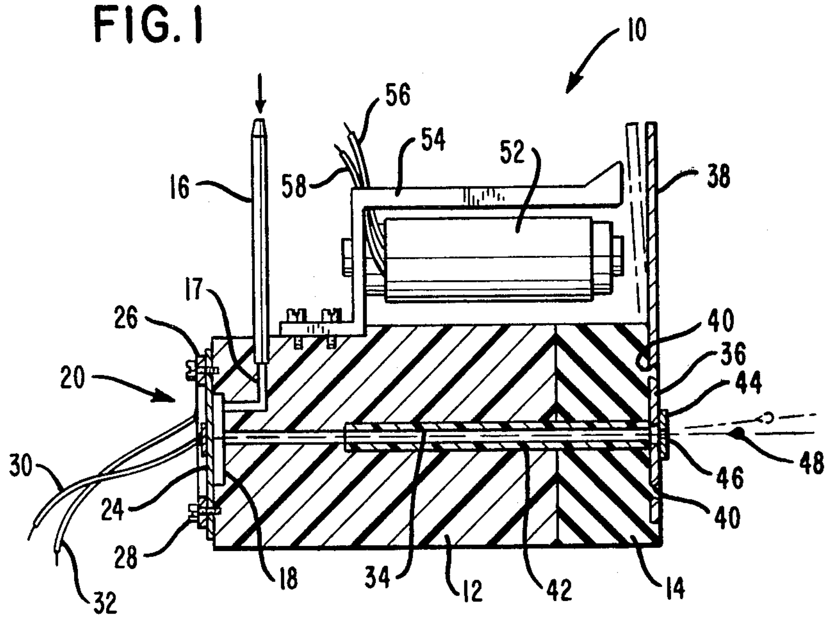
FIG. 1 is a side elevational view, partly in section, of a print head incorporating the subject matter of the present invention.
Figure 2:
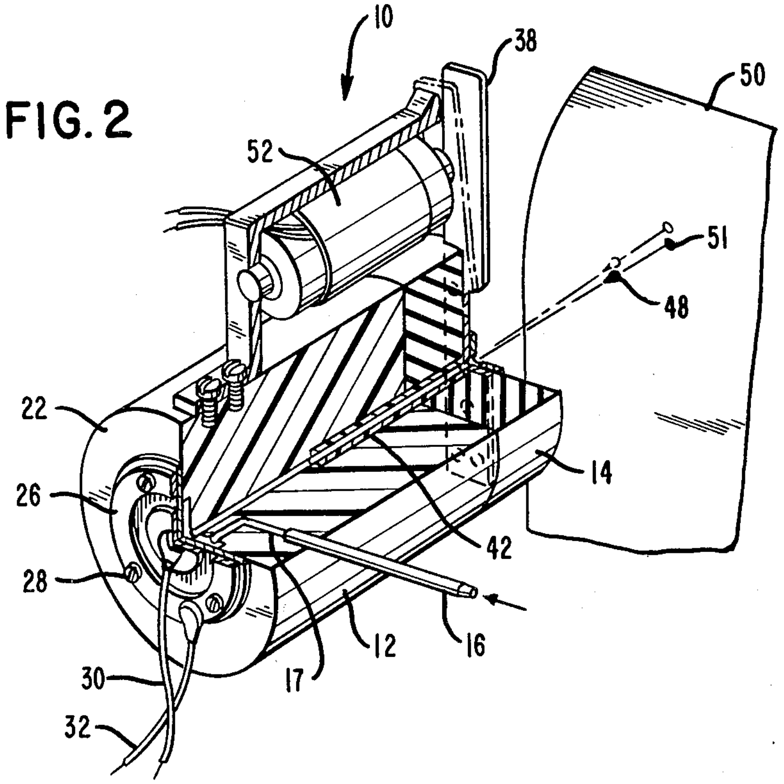
FIG. 2 is a rear perspective view in partial section of a print head similar to that of FIG. 1 and showing the record media.

Referring now to the drawing, FIG. 1 is a side elevational view of a print head, generally designated as 10, which includes a plastic body or major portion 12 of cylindrical form to which is secured on the face at one end thereof an elastic portion or layer 14, preferably made of silicone rubber and in the cylindrical form to match the major portion 12. An ink supply tube 16 carries ink into the rearward area of the plastic body 12 through a passageway 17 and into a circular chamber 18 formed as a cavity in the body portion. The ink supply tube 16 and its associated passageway 17 may be oriented in a horizontal position (FIG. 2) or any other position different therefrom as per the tube position of FIG. 1. A piezoelectric element 20 is secured to the rear face 22, as seen in FIG. 2, of the body portion 12 and includes a diaphragm element 24 covering and overlapping the chamber 18 and also includes a washer-like element 26 along with screws 28 for attaching to the body portion 12. A pair of electrical leads 30 and 32 are attached respectively to the center portion of the diaphragm element 24 and to the washer element 26 for use in pulsing the piezoelectric element 20.

A conduit or like passageway 34 is connected with the ink chamber 18 and extends forwardly through the center of the body portion 12 and through the front elastic portion 14 to a metal vane or like member 36 of generally rectangular form and which includes an orifice 37 therethrough connected and aligned with conduit 34. The metal vane 36 extends from near the bottom of the front surface of the elastic portion 14 upwardly across the face thereof and therebeyond to provide a portion 38 in upstanding manner. The vane 36 is secured to the elastic portion 14 by suitable means such as, for example, through use of an adhesive material and/or in the manner illustrated in FIG. 1 which includes pressing small portions of the elastic layer 14 into depressions 40 of the vane 36. Suffice it to say that the vane 36 may also include projections which are inserted into depressions in the member 14 for securing the vane on the face of the member (see also FIG. 5). A plastic tube 42 is provided along a major length of the conduit or passageway 34 to improve the channelling of ink from the body portions 12 to the elastic portion 14 and thereby prevent ink leakage at the junction between such two portions 12 and 14.

A nozzle plate 44 is secured to the metal vane 36 and includes an orifice 46 therein for ejecting droplets 48 of ink from the print head 10 and onto paper or like record media 50 spaced therefrom and appearing thereon as one or more dots 51 (FIG. 2). The direction and flight path of the droplets 48 emitted from the orifice 46 are controlled by the attitude of the nozzle plate 44 on the metal vane 36. The flight path of the ink droplets 48 can be changed or selectively controlled by moving or tilting the orifice 46 of the nozzle plate 44 a predetermined amount relative to the normal ink channel 34 direction, which is permitted by the flexibility of the plastic tube 42. The tilting movement of the nozzle plate 44 is accomplished by an electro-magnet 52 which is supported by the body portion 12 of the print head by means of an angular bracket member 54. A pair of electrical wire leads 56 and 58 are connected to the electromagnet 52 for energization thereof during operation of the print head 10. FIGS. 1 and 2 show the movement of the metal vane 36 caused by association of the upper portion 38 thereof with the electromagnet 52 to deflect the vane 36 in a tilting motion whereby the nozzle plate 44 is tilted to direct the ink droplet 48 from the solid line path to the dotted line path.

Figure 3:
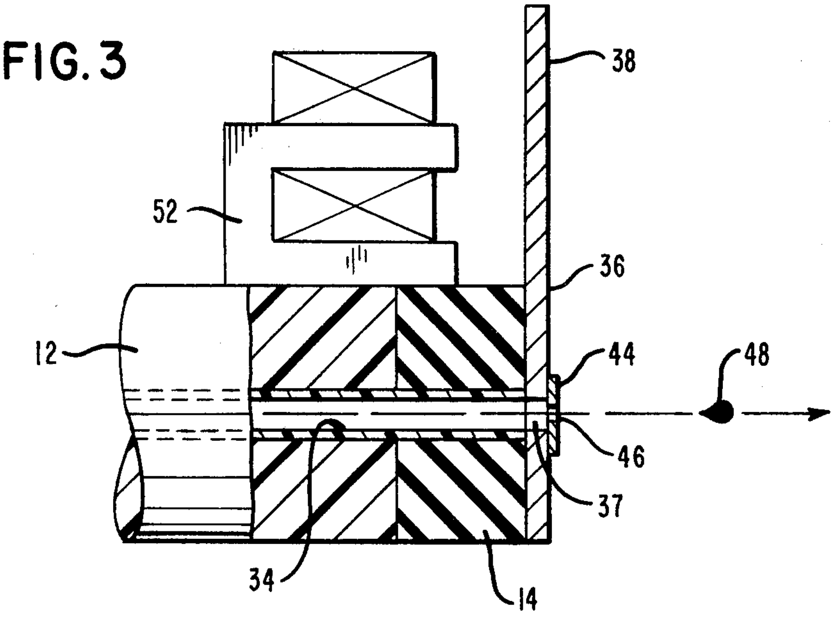
FIG. 3 is a non-proportional functional view showing the nozzle plate of the print head in a normal or at rest position.
Figure 4:
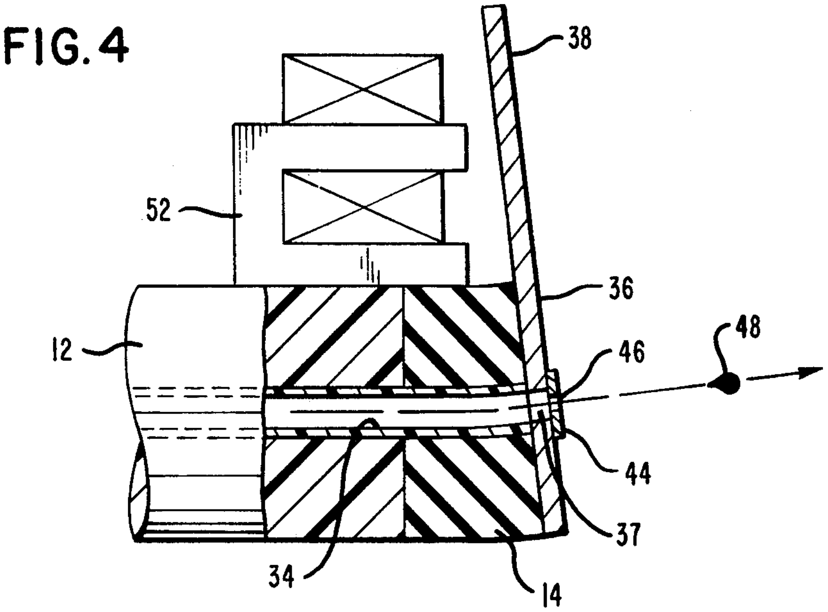
FIG. 4 is a similar view showing the nozzle plate in a tilted position.

FIGS. 3 and 4 are detailed views of the major portions of the print head 10 which include the body portion or element 12, the elastic layer portion 14 and the metal vane 36 along with the electromagnet 52 (shown in diagrammatic form). The ink is caused to be driven by the piezoelectric element 20 along the passageway 34 through an aperture 37 in the metal vane 36 and then through the orifice 46 in the nozzle plate 44 and ejected as a droplet 48. In FIG. 3 the electromagnet 52 is illustrated in its non-energized state whereby the metal vane 36 along with the nozzle plate 44 assume a normal position or relationship with respect to the path of the ink through the passageway 34. In FIG. 4 the electromagnet 52 is shown energized with the upstanding portion 38 of the metal vane 36 attracted by the electromagnet in a manner to tilt the vane 36 and the nozzle plate 44 to cause ejection of the ink droplets 48 in a different path toward the record media.

Figure 5:
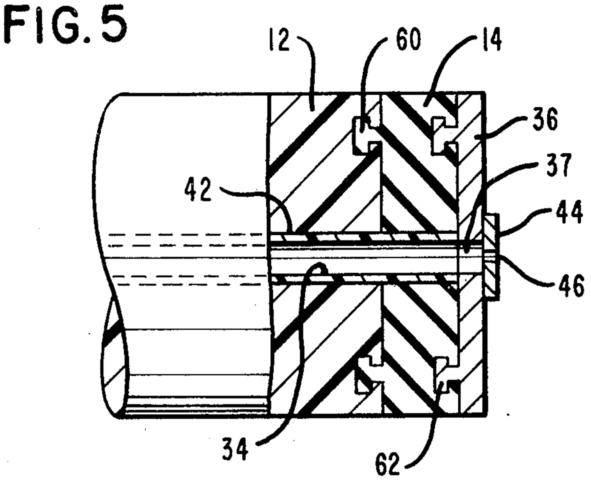
FIG. 5 is a non-proportional view showing certain details of one form of connection of the nozzle plate assembly and the print head.

A further method of connecting the metal vane 36 to the elastic portion 14 and of the portion 14 to the body portion 12 is best understood from FIG. 5. The plastic tube 42 channels the ink through the aperture 37 in the vane 36 and through the orifice 46 in the nozzle plate 44 to effect the ejection of the ink droplets 48. As shown in detail, the elastic portion 14 includes connecting fingers or projections 60 which are embedded in the body portion 12. Likewise, the metal vane 36 includes connecting fingers or projections 62 embedded in the elastic portion 14. Representative diameters of orifice 37 in the vane 36 and of orifice 46 in the plate 44 are 0.6 millimeter and 0.07 millimeter, respectively.

Figure 6:
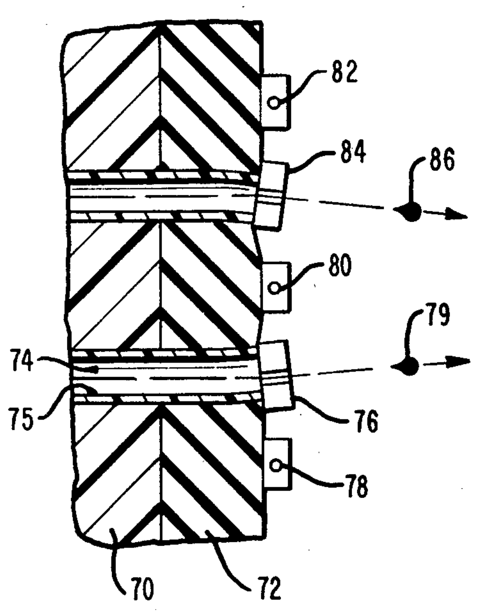
FIG. 6 is a view of a modification of the nozzle plate arrangement.

FIG. 6 shows a modification of the tilting of the nozzle plate wherein a body portion 70 carries an elastic layer 72 on the face thereof and includes one or more channels 74 for carrying the ink to the nozzles. A nozzle plate 76 is secured to the elastic layer 72 and is positioned to receive ink and to eject the ink in droplets 79. Tilting of the nozzle plate 76 is accomplished by means of a magnetic field which is generated by an electric current flowing through a conducting wire 78 adjacent the nozzle plate 76 on one side thereof and a conducting wire 80 on the other side of the nozzle plate 76. The conducting wire 80 may be used commonly with a conductor 82 for acting upon a further nozzle plate 84 which is above the plate 76. In the modification as shown, the nozzle plates 76 and 84 are permanent-magnet type and each includes a north pole and a south pole responsive to flow of current through the respective conductors. The current in conductor 78 is flowing in a direction to provide a magnetic field to tilt the nozzle plate 76 for ejection of the droplet 79 in an upward direction. The current in conductor 82 is flowing in a direction to provide a magnetic field to tilt the nozzle plate 84 for ejection of a droplet 86 in a downward direction. The flow of alternating current through the respective or desired conductors induces an oscillating movement of the selected nozzle plate 76 or 84 on a pivot which is located at the center of the orifice in the nozzle plate. This is once again permitted through flexibility of a plastic tube 75 extending thereto and of the supporting elastic layer 72 to which such nozzle plate is secured.

Operation of the print head shown in FIG. 6 is accomplished in rapid manner by selective tilting of the nozzle plates 76 and 84, which plates are made as small and thin as possible to eject the ink droplets 79, 86, and also by having the pivot point of the tilting movement of the nozzle plate in each instance being in the center of gravity of the plate. In this manner, only very small acceleration forces act on the surface of the ink fluid.

Writing or recording with the ink jet print head disclosed herein is done by moving the paper 50 (FIG. 2) in a direction normal to the direction of ink droplet ejection. In this respect, the paper is usually advanced vertically past the print head or printing station and the droplets are ejected horizontally. The velocity of the vertical paper advancement determines the number of ink dots per unit length printed in a vertical line at a given rate of ink droplet ejection. The faster the paper is advanced, the lower the number of dots per unit length in the vertical direction.

The number of dots per unit length in the horizontal direction is determined by the frequency of oscillation of the nozzle plate and the frequency of drops emitted therefrom per second. Generally, the resonant oscillating frequency of the nozzle plate and of the elastic layer will be chosen in predetermined manner and the frequency of drop emission will be adjusted to obtain a suitable horizontal drop spacing of the horizontal lines. Therefore, a sinusoidal dot spacing is obtained in the horizontal direction unless the drop emission frequency is electronically varied in order to obtain an evenly-spaced dot pattern in the event this is necessary or desirable.

Figure 7:
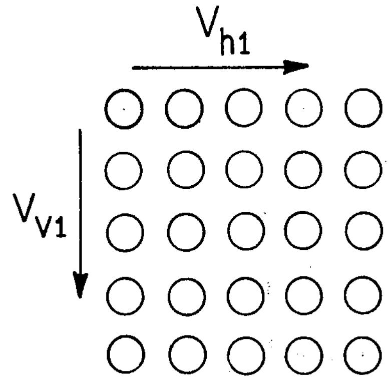
FIG. 7 is a diagram of ink droplets on record media which is advancing at a predetermined velocity past the print head.
Figure 8:
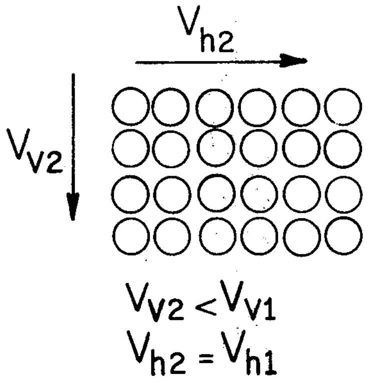
FIG. 8 is a similar diagram of ink droplets on record media which is advancing at a lesser velocity past the print head.

The effect of the vertical velocity $V_v$ and the horizontal velocity $V_h$ as determined by the resonant oscillating frequency of deflection is illustrated in the dot patterns of FIGS. 7 and 8. Both dot patterns are printed at the same oscillating frequency $V_h$, however, the drop emission frequency is higher in the pattern shown in FIG. 8 and results in a higher number of dots per unit length in the vertical direction. The vertical spacing of the dots also may differ by reason of a higher paper advance rate in FIG. 7.

Different dot patterns can be produced by varying either the oscillating characteristics of the nozzle plate and/or the vertical paper advance rate and/or the drop emission frequency. The desired characters are printed by appropriate control of the pulse-on-demand drop emission at a relatively arbitrary resolution as defined by the preselected dot pattern spacing.

It is thus seen that herein shown and described is an ink jet print head having a nozzle plate for emitting ink in droplet form. The direction and precise path of the ink droplets are predetermined by tilting the nozzle plate on a pivot point which is located at the center of the orifice thereof for causing ejection of the ink droplets in the desired direction and manner. The apparatus of the present invention enables the accomplishment of the objects and advantages mentioned above, and while a preferred embodiment and a modification have been disclosed herein, other variations thereof may occur to those skilled in the art. It is contemplated that all such variations not departing from the spirit and scope of the invention hereof, are to be construed in accordance with the following claims.

What is claimed is:

1. An ink jet print head including a
body having a resilient portion secured on the face thereof, an
ink fluid supply, a
nozzle for ejecting droplets of ink from the face of said body,
means for moving ink fluid along a path from said supply through said resilient portion and to said nozzle, and
means including an elongated member carrying said nozzle on the face thereof and an actuator supported from the body adjacent the resilient portion, said elongated member having a portion extending beyond said body and positioned to be movable by said actuator for rapidly tilting said nozzle against the resilient portion and relative to said path for changing the direction of droplets of ink ejected from the nozzle during printing operation.

2. The ink jet print head of claim 1 wherein said body is cylindrical in shape and includes a passageway therethrough.

3. The ink jet print head of claim 1 wherein said moving means includes an actuating member positioned on the face of said body opposite said nozzle.

4. The ink jet print head of claim 1 including a nozzle plate positioned on said face of said body.

5. The ink jet print head of claim 1 wherein said moving means includes a piezoelectric member positioned on the face of the body opposite said nozzle.

6. The ink jet print head of claim 1 wherein said nozzle includes a plate having an orifice therethrough and tiltable against the resilient portion.

7. The ink jet print head of claim 1 wherein said tilting means comprises an electromagnetic actuator adjacent the face of said body and operable to tilt said nozzle.

8. The ink jet print head of claim 6 including a tubular member along said path for causing ink fluid to flow through said resilient portion to said nozzle.

9. The ink jet print head of claim 1 including a chamber adjacent said moving means for containing ink fluid prior to movement thereof along said path.

10. The ink jet print head of claim 1 wherein said nozzle is positioned on the face of said body in said ink path and pivotable at the centerline thereof.

11. A method of controlling the direction of ink droplets ejected from the nozzle of an ink jet print head having a supply of ink fluid provided thereto and having a resilient portion secured on one end thereof, comprising the steps of
providing a passageway to define a path for ink fluid to be moved from said supply through said resilient portion and to said nozzle,
moving said ink fluid in stream-like manner from said supply to said nozzle,
forming droplets of ink at said nozzle in a path aligned with said passageway, and
providing an elongated member carrying said nozzle and an actuator supported from the print head and positioned adjacent the resilient portion to move an extended portion of the member for rapidly tilting the nozzle against the resilient portion whereby droplets of ink are caused to be moved in a path at an angle with respect to said passageway during printing operation.

12. The method of claim 11 wherein the droplet forming step is accomplished at said nozzle on the face of said print head.

13. The method of claim 11 wherein the ink fluid moving step includes electrically actuating the ink fluid for moving thereof along said passageway.

14. The method of claim 11 wherein the nozzle tilting step includes electrically actuating the nozzle for causing pivoting on the center thereof.

* * * * *